No. 665,124.  
A. O'KEEFE.  
COASTER BRAKE.  
(Application filed May 12, 1900.)  
Patented Jan. 1, 1901.

(No Model.)  
3 Sheets—Sheet 1.

WITNESSES:  
Henry Krug  
Russell M. Everett

INVENTOR:  
Andrew O'Keefe,  
BY Drake & Co.  
ATTORNEYS.

No. 665,124. Patented Jan. 1, 1901.
A. O'KEEFE.
COASTER BRAKE.
(Application filed May 12, 1900.)
(No Model.) 3 Sheets—Sheet 2.

WITNESSES: Henry Krug
Russell M. Everett

INVENTOR:
Andrew O'Keefe,
BY
Drake & Co.
ATTORNEYS.

No. 665,124.  Patented Jan. 1, 1901.
A. O'KEEFE.
COASTER BRAKE.
(Application filed May 12, 1900.)
(No Model.)  3 Sheets—Sheet 3.
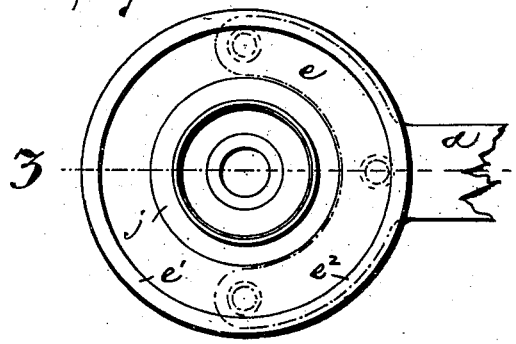
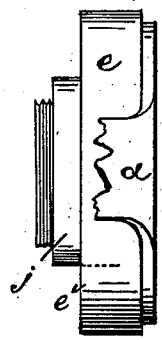
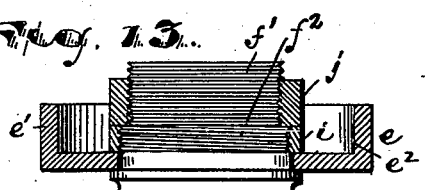
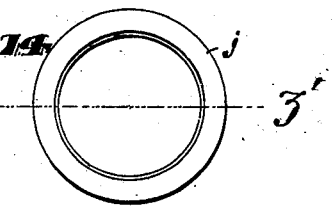
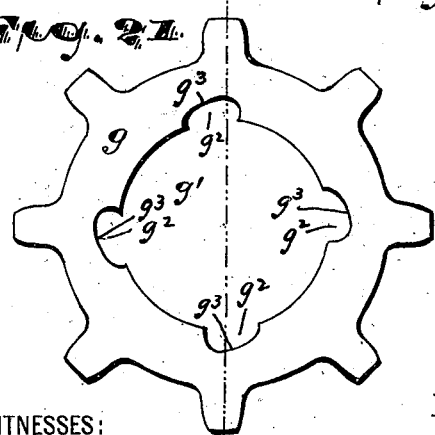
WITNESSES:
Harry Krug
Russell M. Everett
INVENTOR:
Andrew O'Keefe
BY
Drake & Co.
ATTORNEYS.
THE NORRIS PETERS CO., PHOTO-LITHO., WASHINGTON, D. C.

UNITED STATES PATENT OFFICE.

ANDREW O'KEEFE, OF NEWARK, NEW JERSEY.

COASTER-BRAKE.

SPECIFICATION forming part of Letters Patent No. 665,124, dated January 1, 1901.

Application filed May 12, 1900. Serial No. 16,443. (No model.)

*To all whom it may concern:*

Be it known that I, ANDREW O'KEEFE, a citizen of the United States, residing at Newark, in the county of Essex and State of New Jersey, have invented certain new and useful Improvements in Coasting-Brakes for Bicycles, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a coasting-brake of greater efficiency and effectiveness, one that can be more certainly relied upon to brake the movements of the vehicle in the act of coasting, to reduce the cost of construction, to increase the durability and strength of the device, and to secure other advantages and results, some of which may be referred to hereinafter in connection with the description of the working parts.

The invention consists in the improved coasting-brake for bicycles and like vehicles and in the arrangements and combinations of parts of the same, all substantially as will be hereinafter set forth, and finally embraced in the clauses of the claim.

Figure 1:
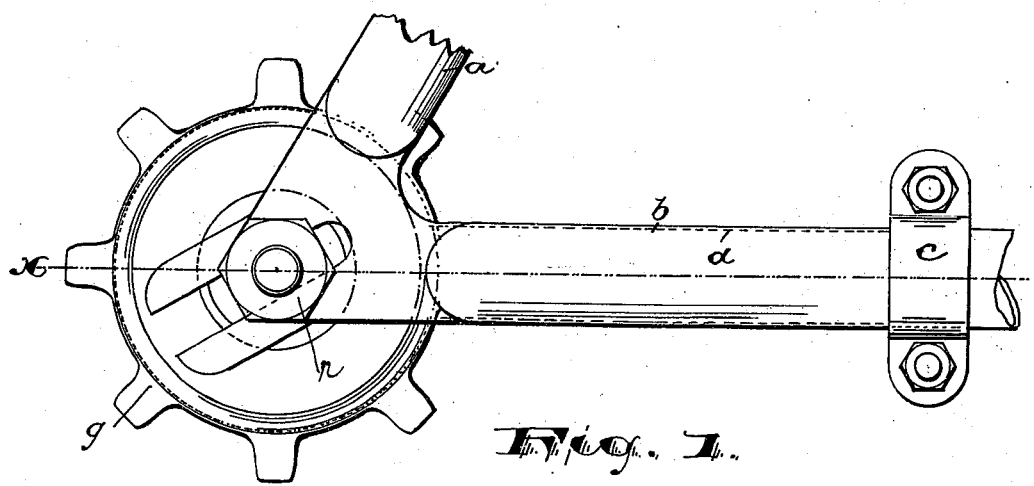
Figure 2:
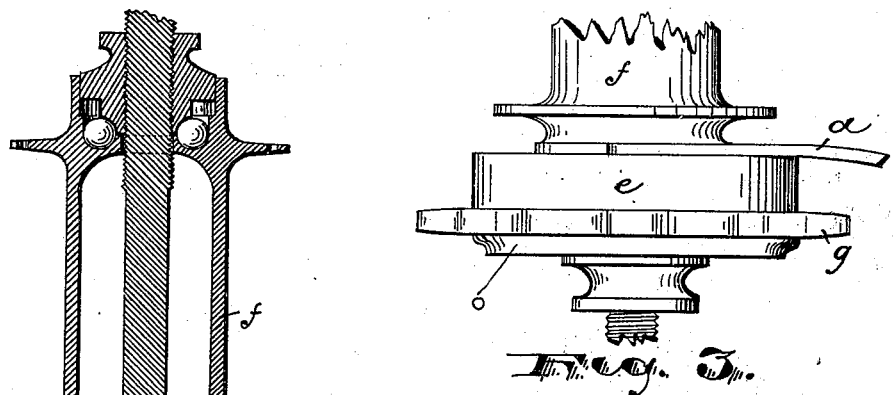
Figure 3:
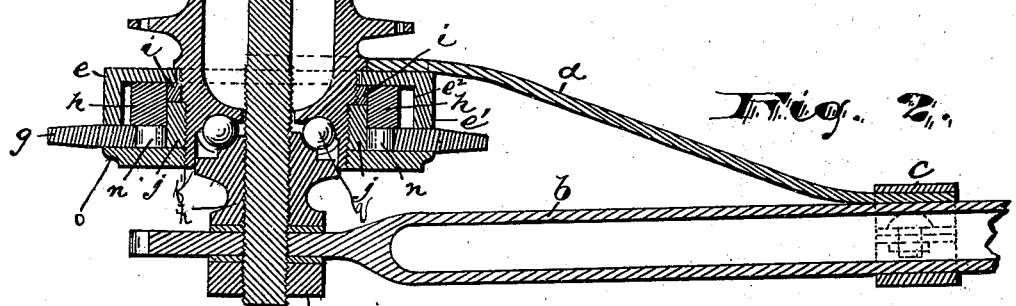
Figure 4:
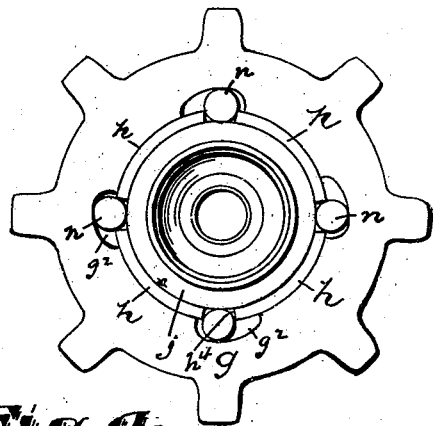
Figure 5:
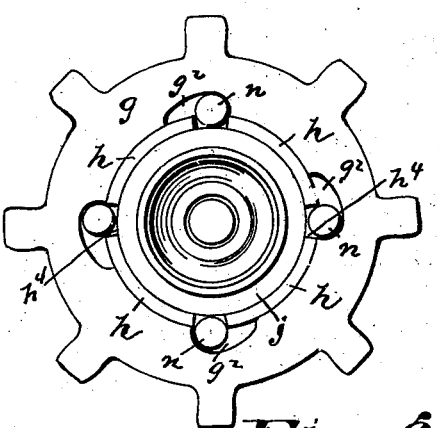
Figure 6:
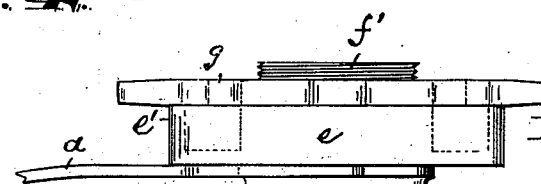
Figure 7:
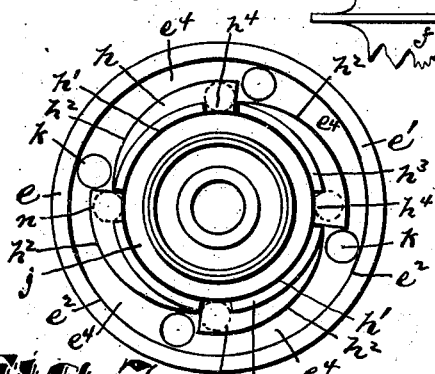
Figure 8:
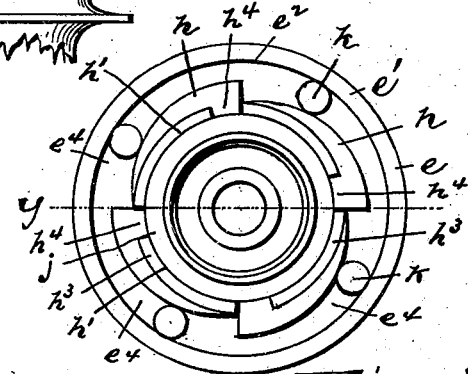
Figure 9:
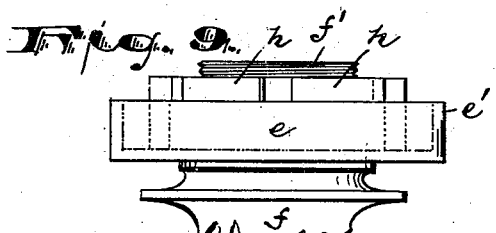
Figure 10:
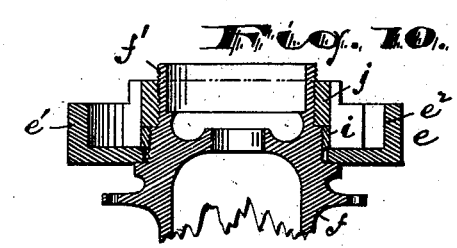

Referring to the accompanying drawings, in which like letters of reference indicate corresponding parts in each of the several views, Figure 1 is a side elevation of a portion of a bicycle-frame and a wheel-hub to which my improved brake has been applied. Fig. 2 is a section of the same, taken through line $x$, Fig. 1. Fig. 3 is a plan of the said brake. Figs. 4 and 5 are detail views of the sprocket-wheel and brake, showing the relation of the brake-shoes to said sprocket-wheel, the parts being viewed from the outside end of the hub, Fig. 4 showing the relation of the parts when the vehicle is being driven forward and Fig. 5 showing the relation of the parts when the forward movement is being broken. Fig. 6 is a detail plan of the sprocket-wheel and braking device detached from the cone and washer of the hub. Figs. 7 and 8 are similar views to Figs. 4 and 5, the sprocket-wheel being removed and showing the brake-shoes more fully, Fig. 7 showing the parts out of braking relation and Fig. 8 showing the parts in braking relation. Fig. 9 is a similar view to Fig. 6, the sprocket-wheel being removed. Fig. 10 is a section taken through line $y$ of Fig. 8. Fig. 11 is an outside view of the case for the brake-shoes. Fig. 12 is an edge view of the same. Fig. 13 is a section taken through line $z$, Fig. 11. Fig. 14 is a detail plan of a threaded locking-ring adapted to secure the case to the hub. Fig. 15 is a section of the same on line $z'$. Fig. 16 is a perspective detail of one of the brake-shoes. Fig. 17 is a plan of a second locking-ring, and Fig. 18 is a section of the same through line $z^2$. Figs. 19 and 20 are detail perspective views of rollers adapted to be employed in connection with the brake-shoes for locking the sprocket-wheel to the hub, one in connection with the forward movements of the vehicle and the other in connection with the braking movements of the vehicle. Figs. 21 and 22 are detail views of the sprocket-wheel, Fig. 22 being taken through line $z^3$ of Fig. 21.

In said drawings, $a$ indicates the frame of a bicycle or similar vehicle, which may be of any suitable construction. Upon the arm $b$ of said frame is separably clamped, by means of any suitable clamp $c$, an arm $d$, to the free bifurcated end of which or at the end opposite to the one clamped to the frame is attached or formed a case $e$, which is centrally perforated to extend over the hub $f$ of the vehicle, the central perforation being of sufficient size to permit a free and independent rotary movement of said hub with the wheel without interference with the stationary case, it being understood that the said case $e$ is fixed to the frame, while the hub rotates under the power imparted thereto from the pedal and connecting-chain (not shown) through the sprocket-wheel $g$. Within said case, as shown more clearly in Figs. 3, 7, 8, and 10, are arranged a series of curved wedge-like braking-shoes $h\ h\ h\ h$, (shown in detail in Fig. 16,) the said curved wedge-shaped shoes, as shown in Fig. 2, having curved frictional surfaces $h'$, adapted to engage the hub of the wheel or the outer peripheries of certain rings $i\ j$ thereon, the said curved surfaces being concentric with the curvature of the rings, as shown in Figs. 7 and 8. The outer surfaces $h^2$ of the said curved wedges are curved eccentric to the said surfaces of the said rings, and between the said eccentric surfaces and the interior walls $e^2$ of the flange $e'$ of the case are arranged a series of rollers $k$, which are adapted, when the said wedges are turned in one direction, to enter the smaller parts of the flaring apertures $e^4$ between said flange and wedges, so as to force the shoes into frictional clamping relation with the hub, and when the sprocket-wheel is turned in the opposite direction said rollers are adapted to enter the larger parts of the apertures $e^4$ between said shoes and flange, so that said shoes are relieved of braking-pressure and the hub is adapted to move free of the case $e$ in response to the power applied to the said sprocket-wheel. The said shoes $h$ at their outer sides are provided with flanges $h^3$, adapted to extend laterally into the large central aperture $g'$, Fig. 21, of the sprocket-wheel $g$, the said sprocket-wheel serving to hold the said shoes freely in their serial relation, (shown in Figs. 7 and 8,) the perforation of the sprocket-wheel being sufficiently large to permit of a slight radial movement of said brake-shoes to and from clamping or braking relation. The said flanges $h^3$, as shown in Fig. 16, are somewhat shorter than the full length of the shoes, apertures $h^4$ being formed between the flange of one shoe and that of the next in serial order, into which apertures $h^4$ are arranged rollers $n$, as indicated in Figs. 4 and 5. Adjacent to said apertures $h^4$, between the flanges $h^3$, are formed a series of apertures $g^2$ within the sprocket-wheel $g$, into which also the rollers extend, as shown in Figs. 4 and 5. The outer walls $g^3$ of said apertures are formed on an incline or are eccentric to the axis of the sprocket-wheel $g$ and hub $f$, so that as the sprocket-wheel is turned to propel the vehicle the said incline will serve to clamp the sprocket-wheel upon the hub, so that the two are held to rotate together to secure a forward movement of the vehicle under the power imparted in pedaling.

In coasting when it is desired to positively retard the progress of the vehicle the rider simply presses upon the pedals reversely or performs what is commonly designated "back-pedaling." In doing so the sprocket-wheel is turned so that the rollers $n$ strike against the end walls of the sprocket-wheel apertures at the larger ends, and the said sprocket-wheel then forces the said rollers against the shoulders of the flanges $h^3$, near the large ends of the brake-shoes, so that the said shoes are driven forward or in the direction of the smaller end, causing the eccentric surfaces $h^2$ to press the rollers $k$ against the flange $e'$ and enter into binding relation with the fixed casing, so that the progress of the vehicle is impeded.

The case $e$ for the brake-shoes is loosely held upon the hub $f$ by means of the threaded collars $i, j$, above referred to, the said hub being peripherally threaded, as at $f'$ $f^2$, to receive the said threaded collars, the threads being preferably right and left hand threads, as indicated in Fig. 13, so that the said collars will not both be loosened at one time when braking-friction is brought upon the peripheries thereof; but under the frictional force of the shoes one ring serves as a lock to the other.

The sprocket-wheel $g$ holds the shoes within the case and in proper serial relation, as before indicated, and the sprocket-wheel is held against the open side of the case by a threaded ring $o$, screwed upon the threads $f'$ of the hub. Outside of said ring is arranged the cone bearing-piece $p$, provided with ball-bearings adapted to lie in the cupped end of the hub having balls $q$, the said bearing-piece $p$ being adjustably secured to the slotted part of the frame by the nut $r$ and axial bolts $s$, as shown in Figs. 1 and 2, or in any other suitable manner.

While I have shown the construction in detail now preferred, I am aware that changes may be made from what is shown and positively described without departing from the spirit and scope of the invention.

Having thus described the invention, what I claim as new is—

1. The combination with the vehicle-frame and wheel-hub, of a centrally perforated and apertured sprocket-wheel loose upon said hub, the apertures being walled by inclined or eccentric bearings for balls or rollers, a case on said hub at the inner side of said sprocket-wheel, an arm $d$, carrying said case and extending to and clamped on said frame, wedge-shaped brake-shoes arranged within said case and having short flanges extending within the sprocket-wheel, rollers interposed between shoulders formed on said shoes and lying within apertures formed in the sprocket-wheel, and rollers interposed between the wedge-shaped shoes and the walls of the case, substantially as set forth.

2. The combination with the vehicle-frame and wheel-hub, of a centrally perforated and apertured sprocket-wheel, the apertures being let in from the perforation of said sprocket-wheel and having inclined walls or bearings $g^3$, said sprocket-wheel being loose on said hub, a flanged case arranged on said hub at the inner side of said sprocket-wheel and held in position by an arm $d$, clamped to said frame, a series of curved wedge-shaped brake-shoes arranged in said case around said hub and having flanges lying within the perforation of the sprocket-wheel with apertures between the ends of the flanges, rollers arranged in the last said apertures and extending into the apertures of the sprocket-wheel and rollers arranged between the wedge-like shoes and the flange of the case, and means for holding the sprocket-wheel to the open side of the case and means for holding the hub to the frame, substantially as set forth.

3. The combination with the vehicle-frame and wheel-hub, having right and left hand screw-threads at one end, a fixed case on said hub, an arm $d$, clamped to the frame and holding said case from rotating with said hub, threaded rings on said right and left hand screw-threads and providing bearings for the brake-shoes, brake-shoes arranged on said rings and in said case and having surfaces eccentric to said rings, and having flanges extending into the perforation of the sprocket-wheel, a centrally perforated and apertured sprocket-wheel arranged on said flanges and at the open side of said case, the walls of the apertures being provided with inclined or eccentric bearings for the balls or rollers, rollers engaging said shoes and extending into the apertures of the sprocket-wheel, rollers arranged between the brake-shoes and the flange of the case, means for holding the hub to the frame and means for holding the sprocket-wheel close against the side of the case, substantially as set forth.

4. In a back-pedaling brake, the combination with the hub, case, sets of rollers and a loose sprocket-wheel with eccentric inner surfaces, of wedges having lateral and short flanges extending into the sprocket-wheel and forming apertures between, in which certain of the rollers may lie, substantially as and for the purposes set forth.

In testimony that I claim the foregoing I have hereunto set my hand this 3d day of May, 1900.

ANDREW O'KEEFE.

Witnesses:
CHARLES H. PELL,
C. B. PITNEY.